(12) United States Patent
Matsumi et al.

(10) Patent No.: US 7,366,733 B2
(45) Date of Patent: Apr. 29, 2008

(54) METHOD AND APPARATUS FOR REPRODUCING PLAY LISTS IN RECORD MEDIA

(75) Inventors: Chiyoko Matsumi, Osaka (JP); Keisuke Matsuo, Nara (JP); Harutoshi Miyamoto, Osaka (JP); Nobuyasu Takeguchi, Osaka (JP); Yasuyuki Torii, Kyoto (JP); Toshihiko Mizukami, Osaka (JP); Kevin Leigh La Chapelle, Redmond, WA (US); Ian Cameron Mercer, Sammammish, WA (US)

(73) Assignees: Matsushita Electric Industrial Co., Ltd., Osaka (JP); Microsoft Corporation, Redmond, WA (US)

( * ) Notice: Subject to any disclaimer, the term of this patent is extended or adjusted under 35 U.S.C. 154(b) by 734 days.

(21) Appl. No.: 10/725,930

(22) Filed: Dec. 3, 2003

(65) Prior Publication Data

US 2004/0151082 A1 Aug. 5, 2004

Related U.S. Application Data

(60) Provisional application No. 60/433,008, filed on Dec. 13, 2002.

(51) Int. Cl.
*G06F 7/00* (2006.01)
(52) U.S. Cl. .................................. 707/104.1; 707/100
(58) Field of Classification Search ..................... None
See application file for complete search history.

(56) References Cited

U.S. PATENT DOCUMENTS 6,006,234 A   12/1999   Govindarajan et al.

6,215,746 B1   4/2001   Ando et al.
6,282,365 B1   8/2001   Gotoh et al.

(Continued)

FOREIGN PATENT DOCUMENTS

EP        0 926 680        6/1999

(Continued)

OTHER PUBLICATIONS

Alesis: "Masterlink Reference Manual", [Online], 2001, Alesis, Retrieved from the Internet: URL:web.archive.org/web/20000902235408/www.alesis.com/downloads/manuals/ml9600_man.pdf [retrieved on Mar. 16, 2005].

(Continued)

*Primary Examiner*—Tan Dinh
(74) *Attorney, Agent, or Firm*—RatnerPrestia

(57) ABSTRACT

There has been a problem that play list reproduction cannot be performed at a data processing level of a CD player and so on which cannot interpret a play list file in an HTML format.

A recording and reproducing system has a CD-RW medium 15 of holding a plurality of data files of storing predetermined data, a file recording means 14 of recording in a play list file 17 held on the CD-RW medium 15 a play list describing reproduction order of reproducing predetermined data stored by all or a part of a plurality of data files respectively by using a unique contents ID given to each data file, and a file reproducing means 23 of reproducing the predetermined data stored by all or a part of the plurality of data files respectively based on the recorded play list.

15 Claims, 7 Drawing Sheets

U.S. PATENT DOCUMENTS

| | | |
|---|---|---|
| 6,285,826 B1 | 9/2001 | Murase et al. |
| 6,292,625 B1 | 9/2001 | Gotoh et al. |
| 6,314,235 B1 | 11/2001 | Gotoh et al. |
| 6,351,442 B1* | 2/2002 | Tagawa et al. .......... 369/53.41 |
| 6,400,893 B1 | 6/2002 | Murase et al. |
| 6,408,301 B1 | 6/2002 | Patton et al. |
| 6,424,797 B1 | 7/2002 | Murase et al. |
| 6,442,333 B1 | 8/2002 | Izawa |
| 6,542,445 B2* | 4/2003 | Ijichi et al. .............. 369/30.08 |
| 6,574,420 B1 | 6/2003 | Gotoh et al. |
| 6,614,732 B2* | 9/2003 | Nonaka et al. .......... 369/30.18 |
| 6,665,690 B2 | 12/2003 | Kimura et al. |
| 6,941,324 B2* | 9/2005 | Plastina et al. .......... 707/104.1 |
| 7,096,234 B2* | 8/2006 | Plastina et al. .......... 707/104.1 |
| 7,159,000 B2* | 1/2007 | Plastina et al. ............... 707/10 |
| 2001/0026504 A1 | 10/2001 | Nonaka et al. |
| 2002/0034130 A1 | 3/2002 | Tagawa et al. |
| 2002/0049731 A1 | 4/2002 | Kotani |
| 2002/0164152 A1 | 11/2002 | Kato et al.1 |
| 2003/0012549 A1 | 1/2003 | Ohnuma |
| 2003/0103604 A1 | 6/2003 | Kato et al. |
| 2003/0174593 A1 | 9/2003 | Tagawa et al. |
| 2003/0194216 A1 | 10/2003 | Gotoh et al. |
| 2003/0194217 A1 | 10/2003 | Gotoh et al. |
| 2003/0194218 A1 | 10/2003 | Gotoh et al. |
| 2003/0206721 A1 | 11/2003 | Gotoh et al. |
| 2003/0226019 A1* | 12/2003 | Nonaka et al. ............. 713/168 |
| 2004/0215873 A1* | 10/2004 | Matsumi et al. ............. 711/112 |
| 2005/0055375 A1* | 3/2005 | Torii et al. ............... 707/104.1 |
| 2005/0111820 A1* | 5/2005 | Matsumi et al. ............... 386/46 |
| 2005/0111831 A1* | 5/2005 | Matsumi et al. ............... 386/95 |
| 2005/0232091 A1* | 10/2005 | Matsuo et al. ........... 369/30.08 |
| 2005/0234858 A1* | 10/2005 | Torii et al. ..................... 707/1 |

FOREIGN PATENT DOCUMENTS

| | | |
|---|---|---|
| EP | 0 949 622 | 10/1999 |
| EP | 0 957 487 | 11/1999 |
| EP | 0 962 929 A2 | 12/1999 |
| EP | 0 962 929 A3 | 12/1999 |
| EP | 1 115 118 | 7/2001 |
| EP | 1 150 297 | 10/2001 |
| EP | 1 198 132 | 4/2002 |
| EP | 1 248 259 | 10/2002 |
| EP | 1 411 520 | 4/2004 |
| JP | 11 297006 | 10/1999 |
| JP | 11-317025 | 11/1999 |
| JP | 2000-235780 | 8/2000 |
| JP | 3098237 | 8/2000 |
| JP | 3297333 | 4/2002 |
| JP | 2002-313070 | 10/2002 |
| JP | 2004-152359 | 5/2004 |
| WO | WO 01/28222 | 4/2001 |
| WO | WO 02/41319 | 5/2002 |
| WO | WO 03/023781 | 3/2003 |
| WO | WO 03/054870 A3 | 7/2003 |
| WO | WO 2004/008460 | 1/2004 |
| WO | WO 2004/027774 A1 | 4/2004 |

OTHER PUBLICATIONS

Audio Interchange File Format: "AIFF"; A Standard for Sampled Sound Files, Version 1.3, Apple Computer, Inc., Jan. 4, 1989, pp. 1-26.

* cited by examiner

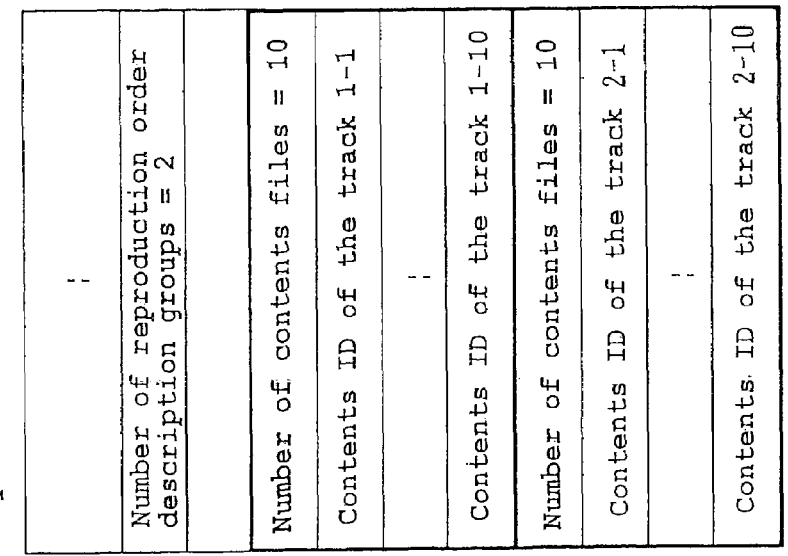
Fig. 5 (B)
Fig. 5 (C)
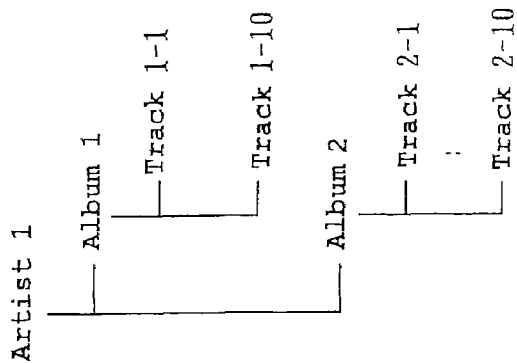
Fig. 5 (A)

US 7,366,733 B2

METHOD AND APPARATUS FOR REPRODUCING PLAY LISTS IN RECORD MEDIA

This application claims priority benefits under 35 U.S.C. §119(c) of U.S. Provisional Application No. 60/433,008 filed on Dec. 13, 2002.

BACKGROUND OF THE INVENTION

1. Field of the Invention

The present invention relates to a recording and reproducing system, a recording apparatus, a reproducing apparatus, a record medium, a recording and reproducing method, a recording method, a reproducing method, a program and a record medium.

2. Description of the Related Art

To begin with, a description will be given as to configuration and operation of a personal computer (refer to Japanese Patent Laid-Open No. 2000-235780, for instance) of reproducing data files such as a video file having video data and an audio file having audio data.

The data files such as the video file and audio file are recorded on a record medium such as a CD-ROM (Compact Disk-Read Only Memory) according to a predetermined file system.

The personal computer performed play list reproduction wherein a play list file in an HTML (Hypertext Markup Language) format describing reproduction order of the data files by using file names of the data files is interpreted to consecutively reproduce a plurality of data files.

However, there was a problem that, at a data processing level of a CD (Compact Disk) player and so on which cannot interpret the play list file in the HTML format as the personal computer does, it is not possible to perform the play list reproduction wherein the play list file is interpreted to consecutively reproduce the plurality of data files.

SUMMARY OF THE INVENTION

In consideration of the above problem in the past, an object of the present invention is to provide a recording and reproducing system, a recording apparatus, a reproducing apparatus, a record medium, a recording and reproducing method, a program and a record medium capable of performing play list reproduction even at a data processing level of a CD player and so on which cannot interpret a play list file in an HTML format.

The 1st aspect of the present invention is a recording and reproducing system comprising:

a record medium for holding a plurality of data files for storing predetermined data;

play list recording means of recording a play list for describing reproduction order in which the predetermined data stored in all or a part of said plurality of data files respectively is reproduced by using a unique data file ID given to each of said data files in a play list file for storing said play list held in said record medium; and data reproducing means of reproducing the predetermined data stored in all or a part of said plurality of data files respectively by using said reproduction order based on said recorded play list.

The 2nd aspect of the present invention is the recording and reproducing system according to the 1st aspect, wherein said plurality of data files further store parameter information used to reproduce said predetermined data respectively;

parameter information recording means of recording all of the parameter information stored in said plurality of data files respectively in a parameter information file for storing said parameter information held in said record medium is further provided; and each of said plurality of data files is given said unique data file ID by using order in which said parameter information file stores said parameter information.

The 3rd aspect of the present invention is the recording and reproducing system according to the 2nd aspect, wherein said data files are managed by using said given unique data file IDs.

The 4th aspect of the present invention is the recording and reproducing system according to the 2nd aspect, wherein said record medium holds a plurality of said play list files;

each of said plurality of play list files has a play list file attribute; and said parameter information file further stores play list file attribute information on the play list file attribute which each of said plurality of play list files has.

The 5th aspect of the present invention is the recording and reproducing system according to the 4th aspect, wherein said plurality of play list files are given unique play list file IDs by using order in which said parameter information file stores said play list file attribute information; and said playlist files are managed by using said given unique play list file IDs.

The 6th aspect of the present invention is the recording and reproducing system according to the 1st aspect, wherein said play list describes said reproduction order by using grouping.

The 7th aspect of the present invention is the recording and reproducing system according to the 1st aspect, wherein said play list describes said reproduction order to be rewritable.

The 8th aspect of the present invention is a recording apparatus comprising: play list recording means of recording a play list in a play list file for storing the play list for describing reproduction order in which predetermined data stored in all or a part of a plurality of data files respectively is reproduced by using a unique data file ID given to each of said data files, said play list file held in a record medium for holding said plurality of data files for storing the predetermined data, wherein the predetermined data stored in all or a part of said plurality of data files respectively is reproduced by using said reproduction order based on said recorded play list.

The 9th aspect of the present invention is a reproducing apparatus, comprising: data reproducing means of reproducing predetermined data stored in all or a part of a plurality of data files respectively by using reproduction order based on a play list recorded in a play list file held in a record medium for holding a plurality of data files for storing predetermined data and a playlist file for storing the playlist for describing said reproduction order in which the predetermined data stored in all or a part of said plurality of data files respectively is reproduced by using a unique data file ID given to each of said data files.

The 10th aspect of the present invention is a record medium for holding a plurality of data files for storing predetermined data and a play list file for storing a play list for describing reproduction order in which the predetermined data stored in all or a part of said plurality of data files respectively is reproduced by using a unique data file ID given to each of said data files, wherein said play list is recorded in said play list file, and the predetermined data stored in all or a part of said plurality of data files respectively is reproduced by using said reproduction order based on said recorded play list.

The 11th aspect of the present invention is a recording and reproducing method comprising:

a play list recording step of recording a play list in a play list file held in a record medium for holding a plurality of data files for storing predetermined data and a play list file for storing the play list for describing reproduction order in which the predetermined data stored in all or a part of said plurality of data files respectively is reproduced by using a unique data file ID given to each of said data files; and data reproducing step of reproducing the predetermined data stored in all or a part of said plurality of data files respectively by using said reproduction order based on said recorded play list.

The 12th aspect of the present invention is a recording method characterized by having a play list recording step of recording a play list in a play list file for storing the play list for describing reproduction order in which predetermined data stored in all or a part of a plurality of data files respectively is reproduced by using a unique data file ID given to each of said data files held in a record medium for holding said plurality of data files for storing the predetermined data, wherein the predetermined data stored in all or a part of said plurality of data files respectively is reproduced by using said reproduction order based on said recorded play list.

The 13th aspect of the present invention is a reproducing method comprising a data reproducing step of reproducing predetermined data stored in all or a part of a plurality of data files respectively by using reproduction order based on a play list recorded in a play list file held in a record medium for holding a plurality of data files for storing predetermined data and the play list file for storing the play list for describing said reproduction order in which the predetermined data stored in all or a part of said plurality of data files respectively is reproduced by using a unique data file ID given to each of said data files.

The 14th aspect of the present invention is a program for causing a computer to execute a play list recording step and a data reproducing step of a recording and reproducing method according to the 11th aspect.

The 15th aspect of the present invention is a program for causing a computer to execute a play list recording step of a recording method according to the 12th aspect.

The 16th aspect of the present invention is a program for causing a computer to execute a data reproducing step of a reproducing method according to the 13th aspect.

The 17th aspect of the present invention is a medium supporting a program according to the 14th aspect and processable by a computer.

The 18th aspect of the present invention is a medium supporting a program according to the 15th aspect and processable by a computer.

The 19th aspect of the present invention is a medium supporting a program according to the 16th aspect and processable by a computer.

BRIEF DESCRIPTION OF THE DRAWINGS

FIG. 5A is an explanatory diagram (1) of grouping of the play list files according to an embodiment of the present invention;

FIG. 5B is an explanatory diagram (2) of the grouping of the play list files according to an embodiment of the present invention;

FIG. 5C is an explanatory diagram (3) of the grouping of the play list files according to an embodiment of the present invention;

DESCRIPTION OF SYMBOLS

Figure 1:
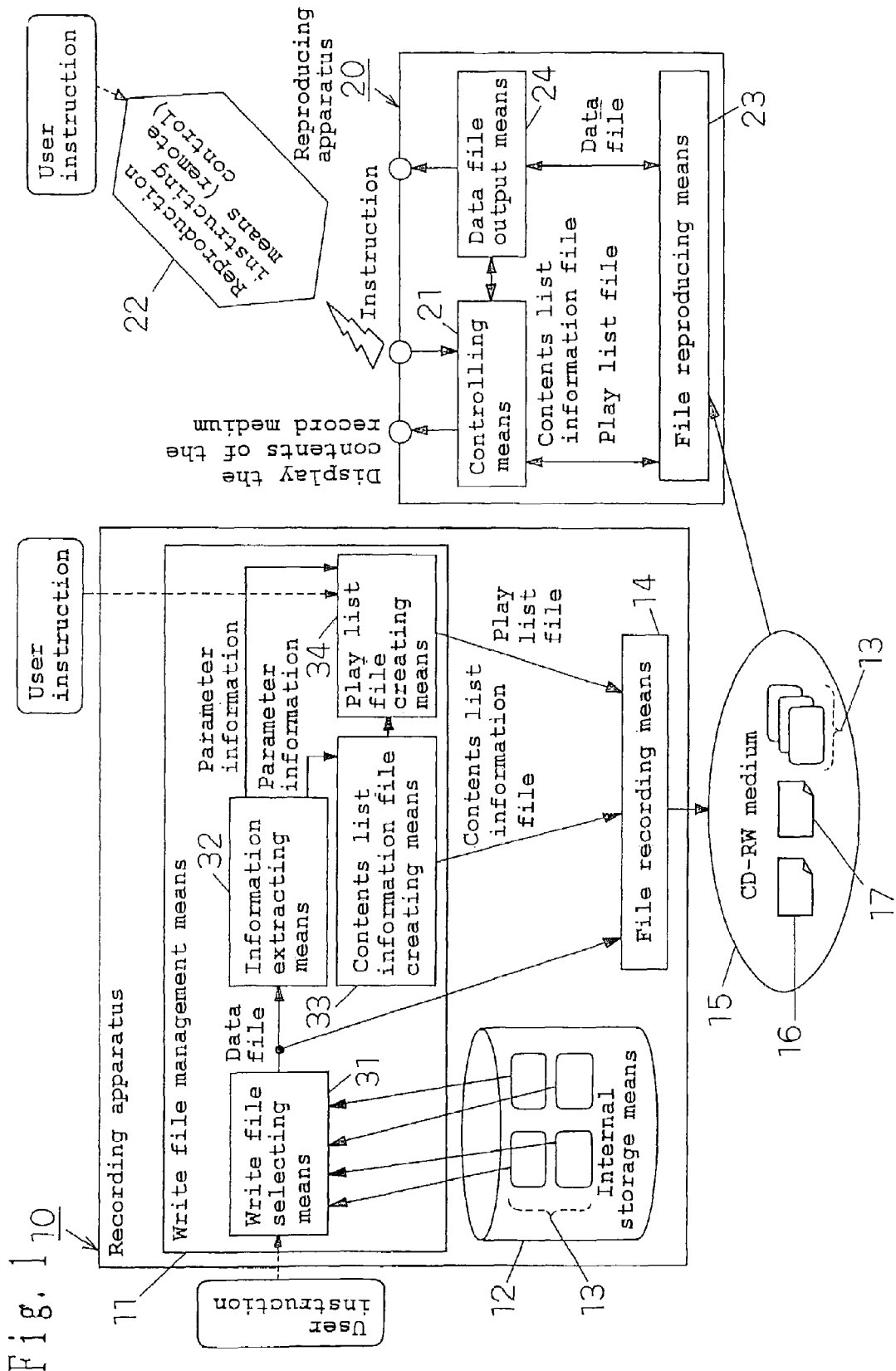
FIG. 1 is a block diagram of a recording and reproducing system according to a first embodiment of the present invention.

10 Recording apparatus
11 Write file management means
12 Internal storage means
13 Data file group
14 File recording means
15 CD-RW medium
16 Contents list information file
17 Play list file
20 Reproducing apparatus
21 Controlling means
22 Reproduction instructing means (remote control)
23 File reproducing means
24 Video/audio file output means
31 Write file selecting means
32 Information extracting means
33 Contents list information file creating means
34 Play list file creating means
40 Header portion
41 Audio file portion
42 Image file portion
43 Video file portion
44 Audio parameter information storage portion
45 Audio file name storage portion
46 Image parameter information storage portion
47 Image file name storage portion
48 Video parameter information storage portion
49 Video file name storage portion
50 Header portion
51 Reproduction order description portion
52 Header portion
53 Reproduction order description portion
60 Play list file information storage portion

DETAILED DESCRIPTION OF THE PREFERRED EMBODIMENTS

Hereafter, embodiments of the present invention will be described by referring to the drawings.

First Embodiment

To begin with, configuration of a recording and reproducing system according to a first embodiment of the present invention will be described by referring mainly to FIG. 1 which is a block diagram thereof.

A recording apparatus 10 has (1) write file management means 11 having write file selecting means 31, information extracting means 32, play list file creating means 34 and contents list information file creating means 33, (2) internal storage means 12 of storing a data file group 13, and (3) file recording means 14 of recording on a CD-RW (Compact Disk Rewritable) medium 15 storing a data file group 13, a contents list information file 16 and a play list file 17.

To be more specific, the write file management means 11 has a CPU (Central Processing Unit) and so on. In addition, the internal storage means 12 has an HD (Hard Disk) and so on. In addition, the file recording means 14 has a CD-RW drive and so on.

The contents list information file 16 and play list file 17 will be described in detail later.

A reproducing apparatus 20 has (1) controlling means 21 of inputting an instruction provided by reproduction instructing means (remote control) 22 and exerting control, (2) file reproducing means 23 of performing reproduction from the CD-RW medium 15, and (3) data file output means 24.

To be more specific, the controlling means 21 has a CPU and so on. In addition, the file reproducing means 23 has a CD-RW drive and so on. In addition, the data file output means 24 has a decoder and so on.

Here, the contents list information file 16 and play list file 17 will be described in detail.

First, (A) the contents list information file 16 and then (B) the play list file 17 will be described.

(A) The contents list information file 16 stores unique parameter information defining the data files (that is, audio files #1, . . . , #n, image files #1, . . . , #m, and video files #1, . . . , #k) themselves belonging to the data file group 13, of the information duplicately extracted by the information extracting means 32.

The parameter information is the information necessary to perform the reproduction of the data files on the CD-RW medium 15. Here, the information necessary to perform the reproduction of the data files is as follows. (1) As for the audio files (that is, the audio files #1, . . . , #n), sampling frequency information, channel number information, compression method information, play duration information, data rate information and so on of defining the audio file and stored as header information in the AVI (Audio Video Interleave) file format, WMA (Windows Media Audio) file format and ASF (Advanced Systems Format) file format, (2) as for the image files (that is, the image files #1, . . . , #m), compression method information, image size information and so on of defining the image file and stored as the header information in the JPEG (Joint Picture Expert Group) file format, and (3) as for the video files (that is, the video files #1, . . . , #k), video frame size information, frame rate information, data rate information, compression method information, reproduction duration information and so on of defining the video file stored as the header information in the AVI file format, WMV (Windows Media Video) file format and ASF file format.

Figure 2:
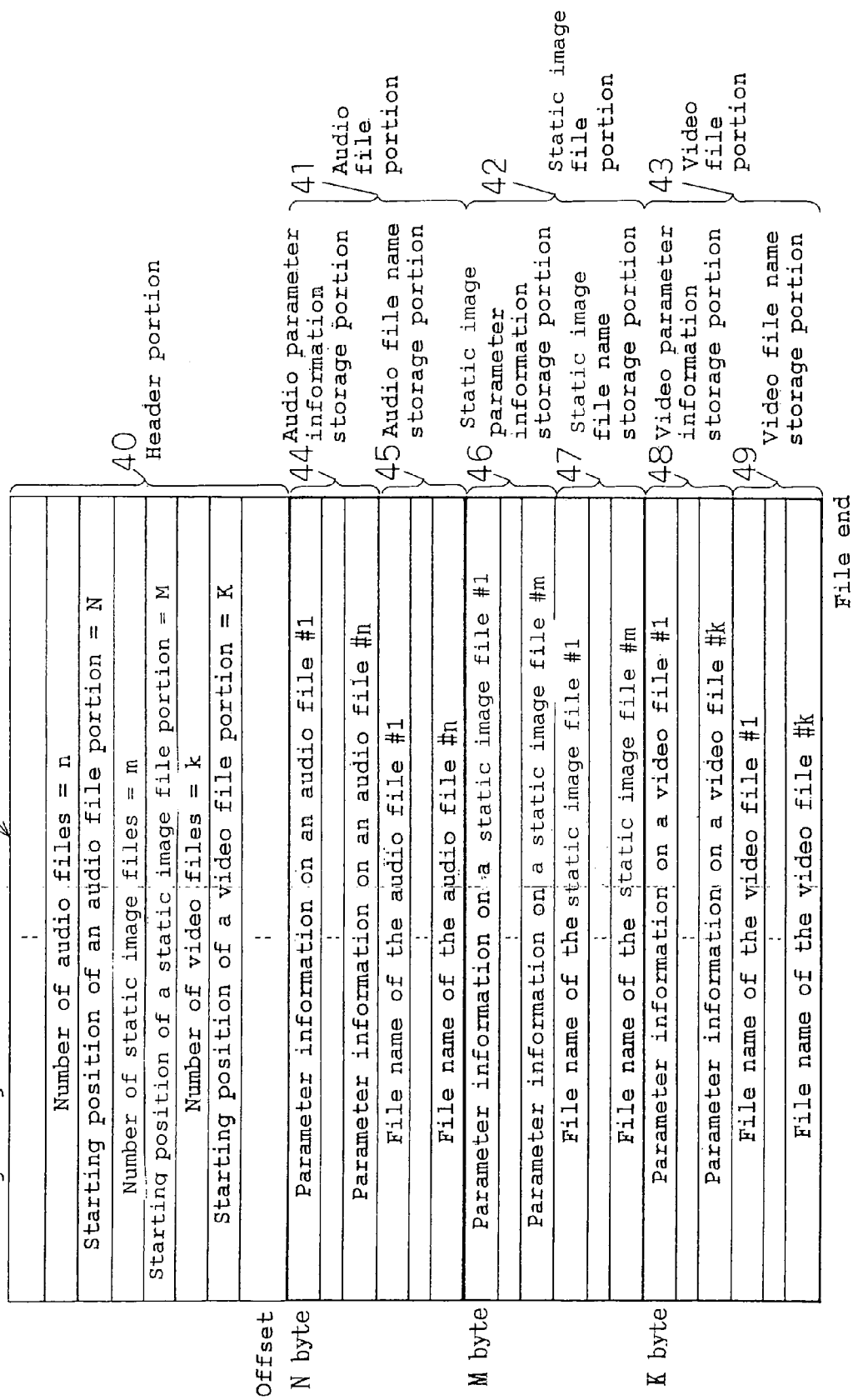
FIG. 2 is an explanatory diagram of a data storage format of a contents list information file 16 according to the first embodiment of the present invention.

Here, the contents list information file 16 according to the first embodiment of the present invention will be described further in detail by referring to FIG. 2 which is an explanatory diagram of a data storage format thereof.

The contents list information file 16 is comprised of a header portion 40, an audio file portion 41, a image file portion 42 and a video file portion 43.

The header portion 40 stores the numbers of the audio files, image files and video files belonging to the data file group 13 which are n, m and k pieces respectively. In addition, the header portion 40 stores the respective starting positions (that is, the numbers of offset bytes from file heads) of the audio file portion 41 comprised of n pieces of information on the audio files #1, . . . , #n, the image file portion 42 comprised of m pieces of information on the image files #1, . . . , #m, and the video file portion 43 comprised of k pieces of information on the video files #1, . . . , #k, which are N bytes, M bytes and K bytes.

The audio file portion 41 is comprised of an audio parameter information storage portion 44 and an audio file name storage portion 45.

The audio parameter information storage portion 44 stores in order the parameter information extracted from each of the audio files #1, . . . , #n, and the audio filename storage portion 45 stores in order the respective file names of the audio files #1, . . . , #n.

The audio files #1, . . . , #n have contents IDs=1, . . . , n assigned thereto according to serial storage order through the audio files, image files and video files of which parameter information is stored in the contents list information file 16.

The image file portion 42 is comprised of a image parameter information storage portion 46 and a image file name storage portion 47.

The image parameter information storage portion 46 stores in order the parameter information extracted from each of the image files #1, . . . , #m, and the image filename storage portion 47 stores in order the respective file names of the image files #1, . . . , #m.

The image files #1, . . . , #m have the contents IDs=n+1, . . . , n+m assigned thereto according to the aforementioned serial storage order.

The video file portion 43 is comprised of a video parameter information storage portion 48 and a video file name storage portion 49.

The video parameter information storage portion 48 stores in order the parameter information extracted from each of the video files #1, . . . , #k, and the video file name storage portion 49 stores in order the file names of each of the video files #1, . . . , #k.

The video files #1, . . . , #k have the contents IDs=n+m+1, . . . , n+m+k assigned thereto according to the aforementioned serial storage order.

(B) The play list file 17 stores the play list of a part or all of the data files belonging to the data file group 13 selected by the write file selecting means 31.

The play list file 17 is a list describing by using the contents IDs reproduction order of the data files specified by a user by means of GUI (Graphical User Interface) input. As a matter of course, the same data file may appear in the play list file 17 more than once.

Figure 3:
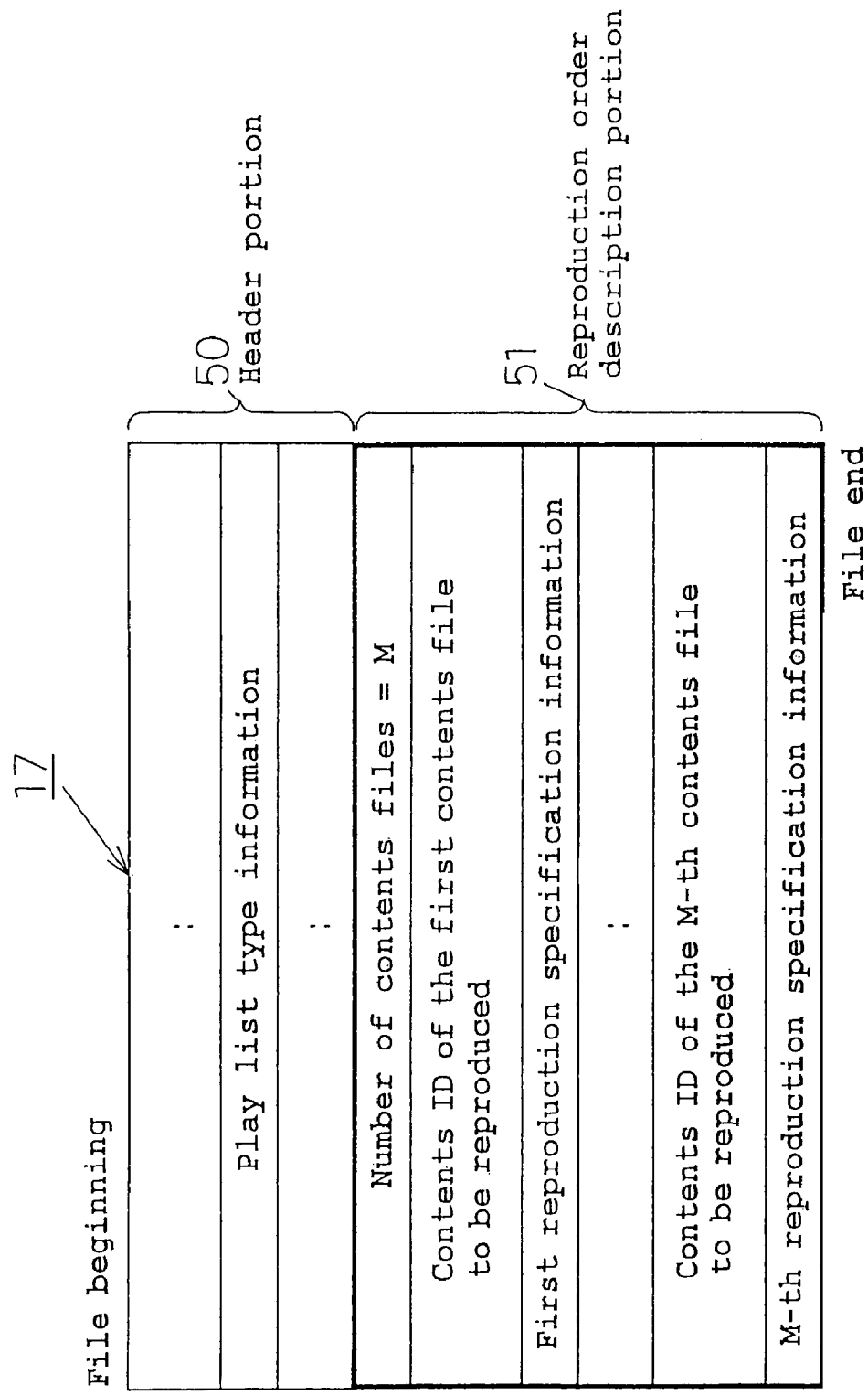
FIG. 3 is an explanatory diagram of the data storage format of a play list file 17 according to the first embodiment of the present invention.

Here, the play list file 17 will be described more concretely by referring to FIG. 3 which is an explanatory diagram of the data storage format of the play list file 17 according to the first embodiment of the present invention.

The play list file 17 is comprised of a header portion 50 and a reproduction order description portion 51.

The header portion 50 stores play list type information indicating a type of the data file included in the play list file as play list file attribute information on play list file attributes belonging to the play list file 17. In this embodiment, the play list type information is one of audio, video and static image.

The reproduction order description portion 51 stores the number of contents files, contents IDs of selected data files and reproduction specification information.

The number of contents files is the number of the selected data files M.

The contents IDs of the selected data files are stored according to the reproduction order of the data files specified by the user.

The reproduction specification information is the information optionally specified as to a reproduction form, which is as follows. (1) As for the audio files and video files, it is the information of specifying a reproduction starting position, a reproduction ending position and so on (specifying the reproduction to start from a position corresponding to a point in time when 30 seconds elapsed from the head, for instance), and (3) as for the image files, it is the information of specifying duration when display is performed and so on. The reproduction specification information on each individual data file is stored as an attachment to the corresponding contents ID of the data file.

The configuration of the recording and reproducing system according to this embodiment was described in detail above.

Next, operation of the recording and reproducing system according to this embodiment will be described.

Moreover, an embodiment of a recording and reproducing method, a recording method and a reproducing method of the present invention will also be described while describing the operation of the recording and reproducing system according to this embodiment.

① To begin with, a description will be given as to the operation of a recording apparatus 10 of recording the data files of the data file group 13 (that is, audio files #1, #n, image files #1, . . . , #m, and video files #1, . . . , #k) and the play list file 17 on the CD-RW medium 15.

The write file selecting means 31 follows an instruction provided by the user to the effect that "the play list file 17 should be created, and the data files of the data file group 13 and the created play list file 17 should be recorded on the CD-RW medium 15" so as to select the data files of the data file group 13 to be recorded on the CD-RW medium 15, of the data files of the data file group 13 stored in the internal storage means 12.

The information extracting means 32 duplicately extracts the information related to the stored data files from the data files of the data file group 13 selected by the write file selecting means 31.

The contents list information file creating means 33 creates the contents list information file 16 by using the parameter information extracted by the information extracting means 32.

As previously mentioned, the contents IDs=1, . . . , n are assigned to the data files of which parameter information is stored in the contents list information file 16 according to serial storage order through all such data files.

The play list file creating means 34 uses the parameter information extracted by the information extracting means 32 to create the play list file 17 related to the files of the data file group 13 selected by the write file selecting means 31 according to a user's instruction by means of the GUI input.

As previously mentioned, the reproduction order of the data files specified by the user is described by using the contents IDs.

The file recording means 14 records the data files of the data file group 13 selected by the write file selecting means 31 on the CD-RW medium 15, and also records the contents list information file 16 created by the contents list information file creating means 33 and the play list file 17 created by the play list file creating means 34 on the CD-RW medium 15.

As a matter of course, the contents list information file 16 thus created on the CD-RW medium 15 may be updated by being overwritten with the parameter information of another data file as write-once.

In addition, the play list file 17 thus created on the CD-RW medium 15 may have the reproduction order rewritten according to the user's instruction and so on.

② Next, a description will be given as to the operation of a reproducing apparatus 20 of reproducing the data files recorded on the CD-RW medium 15 by using the play list file 17.

The reproduction instructing means 22 follows an instruction provided by the user to the effect that "the files recorded on the CD-RW medium 15 should be reproduced by using the play list file 17," and provides the same instruction to the controlling means 21.

The controlling means 21 follows the instruction provided by the reproduction instructing means 22, and provides the same instruction to the file reproducing means 23.

The file reproducing means 23 follows the instruction provided by the controlling means 21, and reads the contents of the contents list information file 16 and the contents of the play list file 17 recorded on the CD-RW medium 15.

As the reproduction order of the data files specified by the user in the play list file 17 is described by using the contents IDs instead of text, such operation can be implemented even at a data processing level of a CD player and so on which cannot interpret the play list file in an HTML format.

The controlling means 21 interprets the contents of the contents list information file 16 and the contents of the play list file 17 which were read, and provides an instruction to the file reproducing means 23 to the effect that the files recorded on the CD-RW medium 15 will be reproduced by using the play list file 17.

The file reproducing means 23 follows the instruction provided by the controlling means 21, and reads the contents of the data files recorded on the CD-RW medium 15.

The data file output means 24 outputs the contents of the read data files by utilizing format conversion from a file format to an output format.

As a matter of course, such reading of the contents of the data files and output of the contents of the read data files are performed in the reproduction order of the data files described in the play list file 17.

The operation of the recording and reproducing system according to this embodiment was described in detail above.

Next, effects that the recording and reproducing system according to this embodiment has will be described.

(a) The recording and reproducing system according to this embodiment reproduces the data files recorded on the created record medium in the reproduction order specified by the user when creating the record medium on which the data files are recorded.

For this reason, the recording and reproducing system according to this embodiment can reproduce the data files in the reproduction order just as intended by a creator of the record medium.

(b) The recording and reproducing system according to this embodiment performs data management in the playlist file 17 by using the contents IDs instead of the file names. As a matter of course, the contents IDs are uniquely associated with the file names by using the contents list information file 16.

As for the contents IDs, a 32-bit ID may be used for instance, which is small enough compared to a data size of the file name.

For this reason, the recording and reproducing system according to this embodiment can render the size of the play list file 17 small so as to effectively exploit the capacity of the CD-RW medium 15 for the sake of recording the video files and audio files as originally intended.

(c) In addition, the recording and reproducing system according to this embodiment classifies the files by the data formats such as the audio, image and video, and stores the play list type information of the respective classes in the header portion 50 of the play list file 17.

For instance, in the case where the data file output means 24 can only reproduce the audio files, only the play list files of which play list type information is the audio is read based on the information of the header portion 50 when reading the play list file 17, and the play list files of which play list type information is the image and video are not read then.

For this reason, the recording and reproducing system according to this embodiment can filter the play list files and promptly present only available play list files as alternatives to the user so that a user-friendly product can be realized.

The first embodiment was described in detail above.

(1) Moreover, according to the above-mentioned embodiment, the play list file of the present invention is the play list file 17.

However, the play list file of the present invention is not limited thereto, but in short, it may be any file held by the record medium for the sake of storing the play list describing reproduction order of reproducing predetermined data stored by all or a part of a plurality of data files by using a unique data file ID given to each data file.

(2) In addition, a parameter information file of the present invention is the contents list information file 16 according to the above-mentioned embodiment.

However, the parameter information file of the present invention is not limited thereto, but in short, it may be any file to be held by a record medium for the sake of storing the parameter information, wherein all the parameter information stored by the plurality of data files respectively is recorded.

(3) In addition, according to the above-mentioned embodiment, the data file ID of the present invention is the contents ID to be provided to each of the plurality of data files by using the order in which the parameter information file stores the parameter information.

However, the data file ID of the present invention is not limited thereto, but in short, it may be any unique ID to be provided to each of the data files.

(4) In addition, according to the above-mentioned embodiment, the play list file attribute information of the present invention is the play list type information.

However, the play list file attribute information of the present invention is not limited thereto, but in short, it may be any information on play list file attributes belonging to a plurality of play list files respectively.

(5) In addition, according to the above-mentioned embodiment, the record medium of the present invention is the CD-RW medium 15.

However, the record medium of the present invention is not limited thereto, but it may be a removable medium such as a CD-R (Compact Disk-Recordable) medium or a DVD-R (Digital Versatile Disk-Recordable) medium, or a built-in storage such as an HDD (Hard Disk Drive) built into the recording apparatus or reproducing apparatus.

In short, the record medium of the present invention may be any means of storing the plurality of data files of storing the predetermined data and the play list file of storing the play list describing the reproduction order of reproducing the predetermined data stored by all or a part of the plurality of data files respectively by using the unique data file ID given to each data file.

(6) In addition, according to the above-mentioned embodiment, play list recording means of the present invention is the means including the file recording means 14, information extracting means 32 and play list file creating means 34 of recording in the play list file 17 the reproduction order of reproducing the data stored in the data files by using the contents ID provided through the use of the order in which the parameter information extracted from the data file of the data file group 13 is stored in the contents list information file 16.

However, the play list recording means of the present invention is not limited thereto, but in short, it may be any means of recording, in the play list file of storing the play list held by the record medium, the play list describing the reproduction order of reproducing the predetermined data stored by all or a part of the plurality of data files respectively by using the unique data file ID given to each data file.

(7) In addition, according to the above-mentioned embodiment, data reproducing means of the present invention is the means including the file reproducing means 23.

However, the data reproducing means of the present invention is not limited thereto, but in short, it may be any means of reproducing the predetermined data stored by all or a part of the plurality of data files respectively by using the reproduction order based on the recorded play list.

(8) In addition, according to the above-mentioned embodiment, parameter information recording means of the present invention is the means including the file recording means 14, the information extracting means 32 and the contents list information file creating means 33 of recording the parameter information extracted from the data file of the data file group 13 in the contents list information file 16.

However, the parameter information recording means of the present invention is not limited thereto. For instance, the parameter information stored in the data file of the data file group 13 is also stored in a predetermined place such as an FTP (File Transfer Protocol) server on the Internet, and so the parameter information recording means of the present invention may also be the means of obtaining the parameter information stored in the predetermined place and recording the obtained parameter information in the contents list information file 16.

In short, the parameter information recording means of the present invention may be any means of recording the parameter information stored by the plurality of data files respectively in the parameter information file to be held by the record medium for the sake of storing the parameter information.

(9) In addition, according to the above-mentioned embodiment, the record medium of the present invention has one play list file 17.

However, the record medium of the present invention is not limited thereto, but it may also have a plurality of play list files.

As a matter of course, in the case where the plurality of play list files are held, it is specified by the user's instruction and soon as to which playlist file the reproduction of the predetermined data will be based on.

(10) In addition, according to the above-mentioned embodiment, the play list file of the present invention is created according to a user's instruction by means of the GUI input.

However, the play list file of the present invention is not limited thereto, but it may also be automatically created according to a predetermined algorithm of reproducing file names in alphabetical order.

(11) In addition, the play list of the present invention may also describe the reproduction order by utilizing grouping.

For instance, the play list of the present invention may also collectively store the specified plurality of reproduction order specifications in the case where the user provides an instruction to group a plurality of reproduction order specifications for the sake of specifying the reproduction order, and store only one reproduction order specification in the case where there is no aforementioned user instruction.

Figure 4:
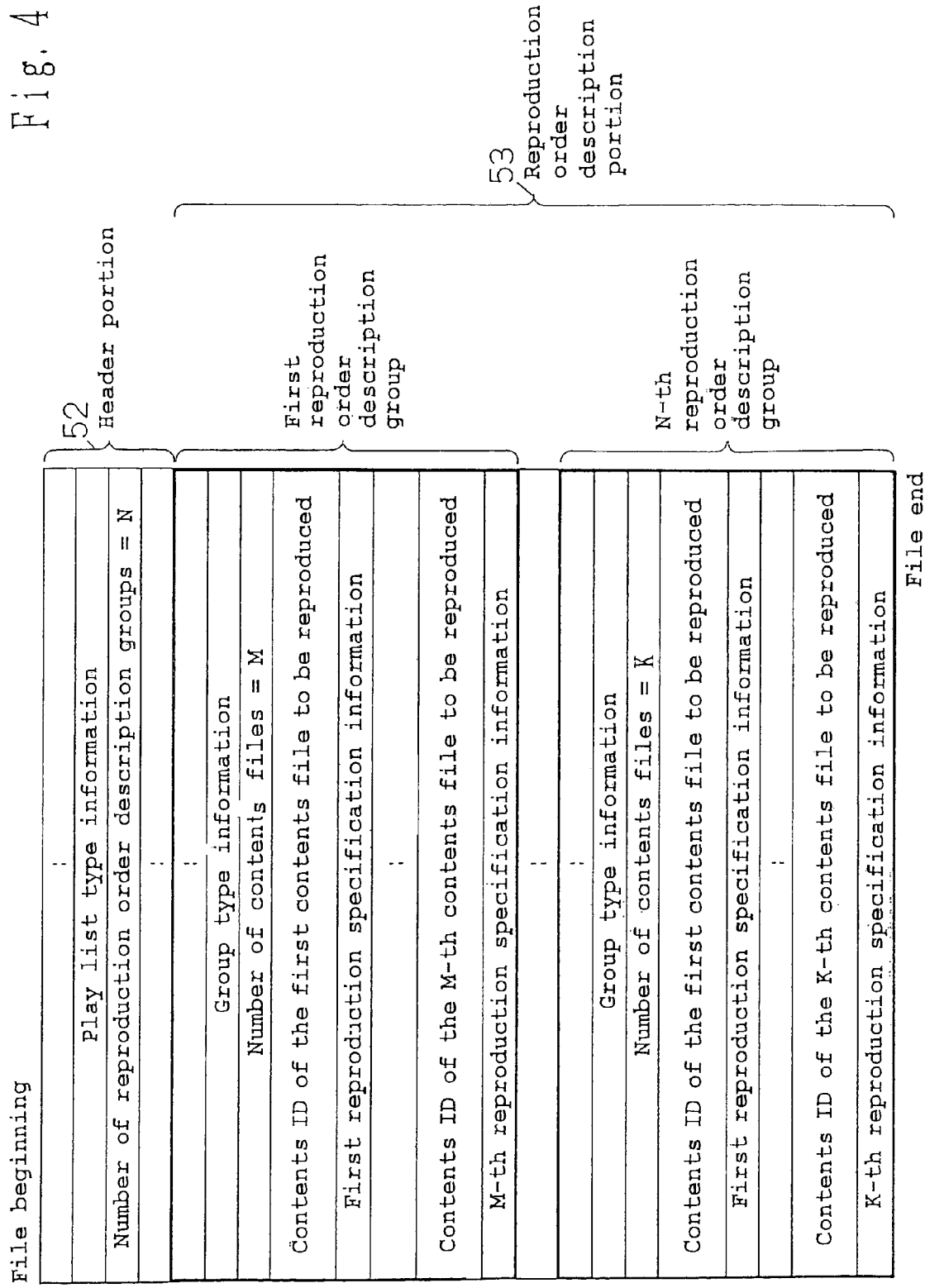
FIG. 4 is an explanatory diagram of the data storage format of a play list file according to an embodiment of the present invention.

To be more specific, as shown in FIG. 4 which is an explanatory diagram of the data storage format of the play list file according to an embodiment of the present invention, the play list of the present invention may be comprised of a header portion 52 and a reproduction order description portion 53.

The header portion 52 stores the playlist type information and the number of reproduction order description groups.

The play list type information is the same information as the play list type information described in the aforementioned first embodiment. The number of reproduction order description groups is the number N of the reproduction order description groups stored in the reproduction order description portion 53.

The reproduction order description portion 53 stores the first to N-th reproduction order description groups.

The first to N-th reproduction order description groups store group type information, the number of contents files, the contents ID of the data file to be reproduced and reproduction specification information of the data file respectively.

The group type information is the information indicating a data file type (one of the audio/video/image) included in the reproduction order description group. The number of contents files is the number of the data files of which reproduction order is specified in the reproduction order description group. The contents ID of the data file to be reproduced is stored according to the reproduction order. The reproduction specification information is the information of specifying the reproduction starting position, reproduction ending position and so on in the file in the case where the data file to be reproduced is the audio file or video file, and it is the information of specifying the display duration of the image and so on in the case where the data file to be reproduced is the image file.

It is possible for instance, by utilizing such grouping, to group music files of the same artist and specify the reproduction order of the music files in each group so as to collectively hold the information on the reproduction order of the aforementioned music files of the same artist in one play list file.

To be more specific, as shown in FIG. 5A which is an explanatory diagram (1) of the grouping of the play list files according to an embodiment of the present invention, the music file of the same artist-track 1-1, track 1-2, . . . , track 1-10, track 2-1, track 2-2, . . . , track 2-10 are grouped into an album 1 comprised of the music file track 1-1, . . . , track 1-10 and an album 2 comprised of the music file track 2-1, . . . , track 2-10. And as shown in FIG. 5B which is an explanatory diagram (2) of the grouping of the play list files according to an embodiment of the present invention, the reproduction order of the music file track 1-1, . . . , track 1-10 is specified in this order in the album 1, and the reproduction order of the music file track 2-1, . . . , track 2-10 is specified in this order in the album 2 so as to collectively hold the information on the reproduction order of the music file track 1-1, track 2-10 in one play list file for an artist 1.

Moreover, the artist 1 is a concrete example of a name of the play list file given thereto for the sake of better usability for the user. In addition, the album 1 and album 2 are concrete examples of names of the groups of specifying the reproduction order given thereto for the sake of better usability for the user.

As a matter of course, as shown in FIG. 5C which is an explanatory diagram (3) of the grouping of the play list files according to an embodiment of the present invention, it is also feasible to utilize two play list files, that is, the play list file for the artist 1-album 1 of specifying the reproduction order of the music file track 1-1, . . . , track 1-10 in this order in the artist 1-album 1 comprised of the music file track 1-1, . . . , track 1-10 and the play list file for the artist 1-album 2 of specifying the reproduction order of the music file track 2-1, . . . , track 2-10 in this order in the artist 1-album 2 comprised of the music file track 2-1, . . . , track 2-10.

However, in the case where the user desires to switch the reproduction orders, it is possible in the former case (refer to FIG. 5B) to promptly reproduce the data file with different reproduction order specification just by changing the groups in one play list, whereas, in the latter case (refer to FIG. 5C), only one reproduction order specification exists in one play list file, and so some response waiting time may be required before a different playlist file is read and loaded into a memory.

(12) In addition, the reproduction based on the play list of the present invention may be started from any data file.

To be more specific, in the aforementioned case where the reproduction order is described by utilizing the grouping for instance, the play list of the present invention may have the information of specifying which file of which group the reproduction should be started from stored therein.

As a matter of course, even on a low-end model capable of changing the groups but incapable of specifying the data file of which reproduction is to be started of the data files belonging to the groups, it is possible, by creating in advance the group having the data files of which reproduction is to be started shifted one by one, to realize an equivalent of the specification thereof by utilizing group switching operation.

(13) In addition, the reproduction based on the play list of the present invention may be performed by simultaneously using two or more data files.

For instance, a plurality of reproduction orders are stored in one play list file, and the information of providing an instruction to concurrently reproduce the reproduction orders is stored in the aforementioned play list type information. And on reading the play list type information and detecting that the instruction to concurrently reproduce the reproduction orders is stored therein, the reproducing apparatus concurrently implements the reproduction orders stored in the play list file.

To be more specific, one play list file has the reproduction order of the image files and the reproduction order of the audio files and video files stored therein, so that the audio files are reproduced in the specified order while reproducing the images in the specified order.

As a matter of course, in the case where the reproducing apparatus has no concurrent reproduction function, it is sufficient to store in the play list file a control instruction to perform reproduction operation by interpreting only a single reproduction order, and so it is not necessary to separately prepare the play list for the reproducing apparatus having the concurrent reproduction function and the play list for the reproducing apparatus having no concurrent reproduction function.

In addition, it is also feasible, by storing in the play list file the information on the file size of the static image file having the reproduction order specified therein in addition to the plurality of reproduction orders, to determine on the reproduction whether or not all the static image files of which the reproduction order is specified are within the predetermined file size and switch the reproduction operation accordingly. It is also feasible to have the predetermined file size determined by the reproducing apparatus according to the capability of the reproducing apparatus to process the static image files. As for switching of the reproduction operation, it is also possible to perform concurrent reproduction only in the case where all the static image files are within the predetermined file size, and perform the reproduction operation by interpreting only a single reproduction order in the case where, of the static image files of which reproduction order is specified, there is a static image file exceeding the predetermined file size.

In general, processing time necessary for a reproduction process of the static image file requires file reading and decoding processes which become longer in proportion to the file size. Therefore, there is a possibility that, in the case where there exists a large-size file among the static image files of which reproduction order is specified, there arises a problem that the reproduction process thereof takes time so that the reproduction of the audio file and video file cannot be synchronized therewith.

As previously described, if the information on the size of the static image file is stored in the play list file, it is possible to control the operation on the reproduction according to the reproduction processing capability of the static image files so as to curb the occurrence of the aforementioned problem that it cannot be synchronized with the reproduction of the audio file and video file.

To be more specific, only in the case where the file size of the reproduced file is within the processing capability, the reproducing apparatuses can perform the concurrent reproduction, and it is possible to provide the low-cost reproducing apparatuses having a concurrent reproduction function according to the processing capability.

It is thus possible, even at the data processing level of the reproducing apparatus which cannot interpret the play list file in an HTML format, to realize an advanced reproduction function of concurrently reproducing the image and audio (a function of performing a presentation by slides to which audio narration is added, for instance). In addition, even the reproducing apparatus having no concurrent reproduction function can reproduce only the images, for instance, in the specified reproduction order for the play list created on the precondition of concurrently reproducing the image and audio, so that the information on the images can be appreciated in the order intended by the creator of the record medium.

(14) In addition, the parameter information file of the present invention may further store the information on the play list file attributes belonging to the plurality of play list files respectively.

Figure 6:
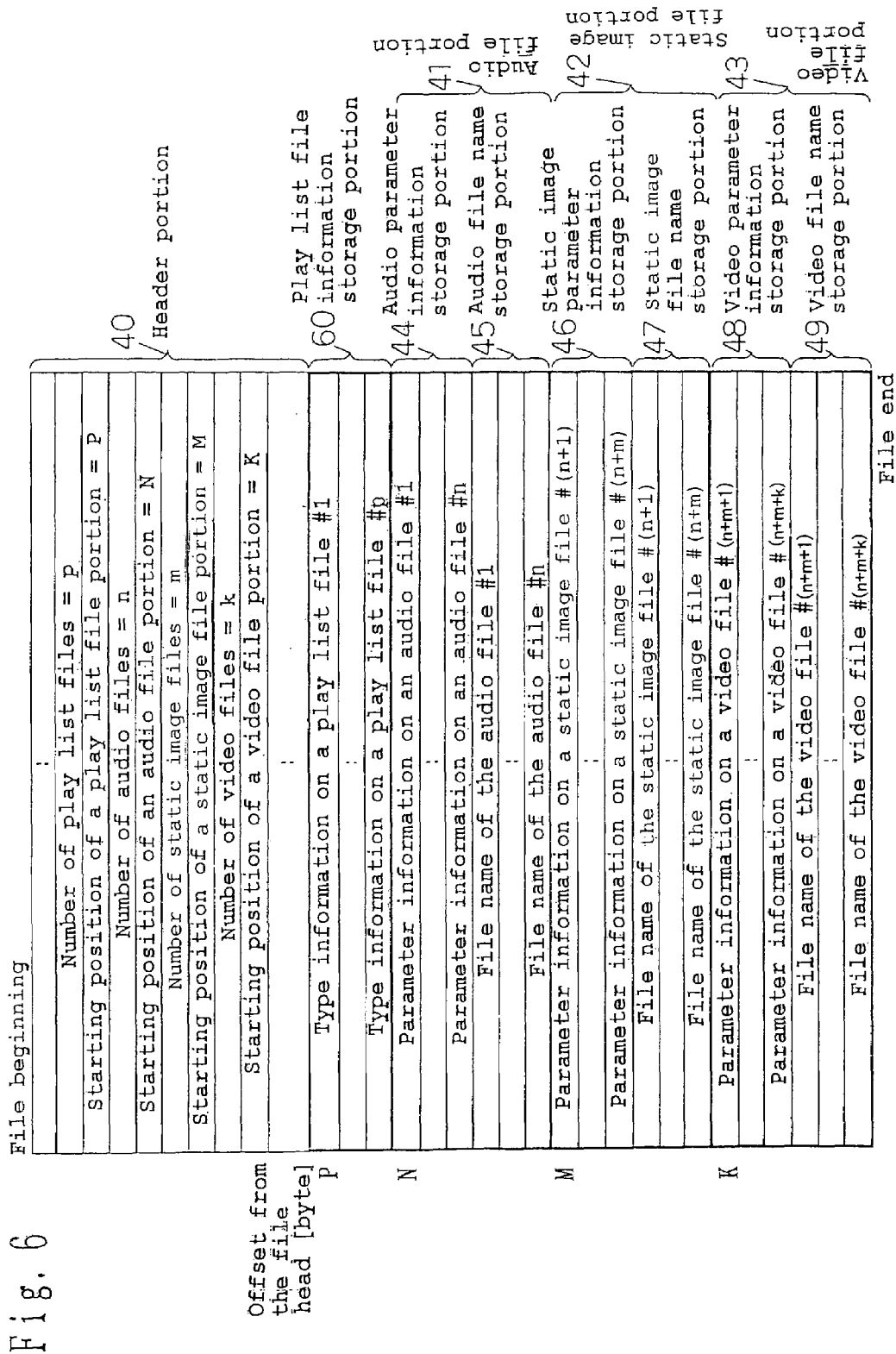
FIG. 6 is an explanatory diagram of the data storage format of a contents list information file according to an embodiment of the present invention.

For instance, as shown in FIG. 6 which is an explanatory diagram of the data storage format of the contents list information file according to an embodiment of the present invention, the parameter information file of the present invention may have a playlist file information storage portion 60 of storing the type information on play list files #1, . . . , #p in order.

Figure 7:
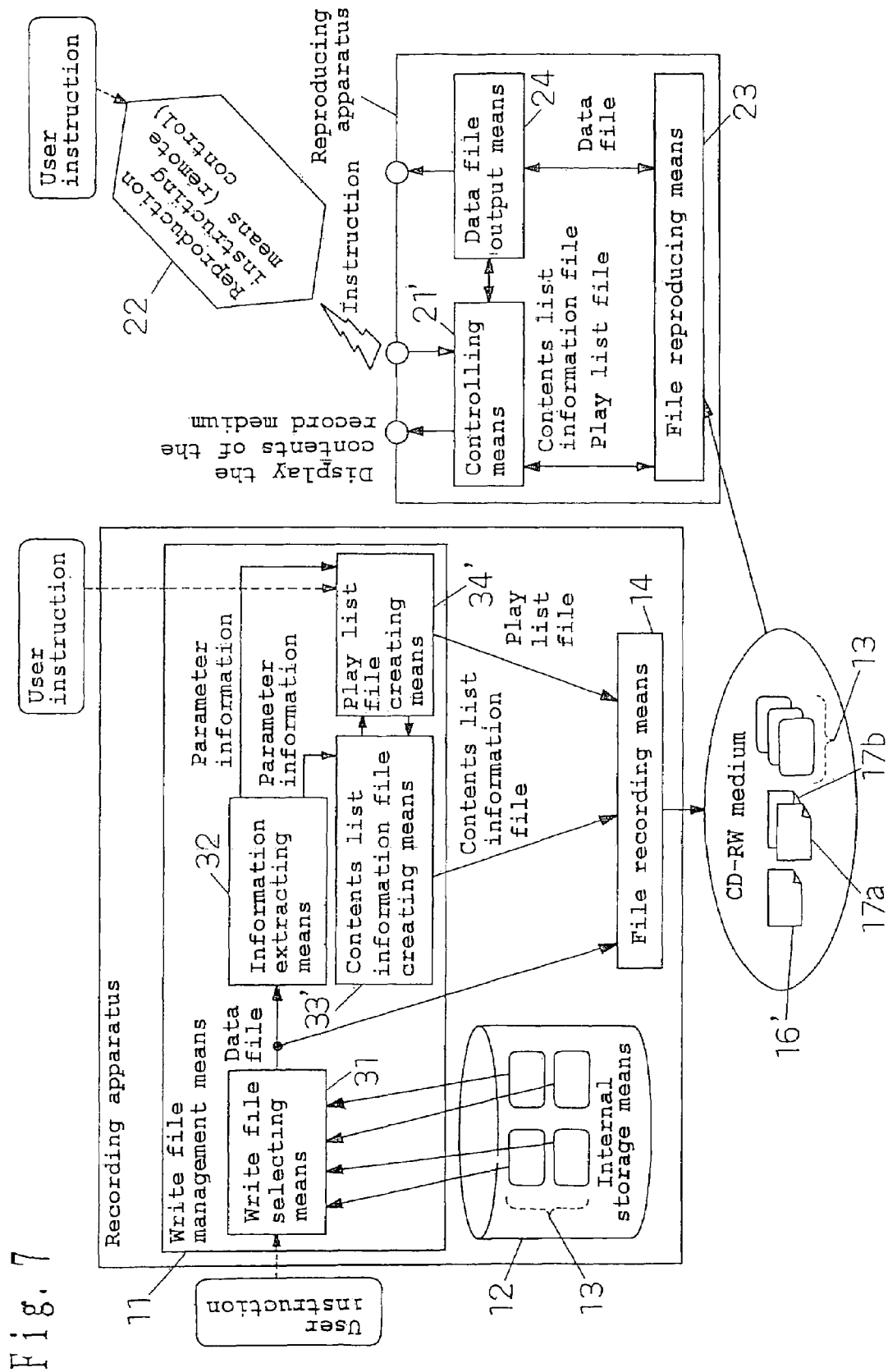
FIG. 7 is a block diagram of the recording and reproducing system according to an embodiment of the present invention.

To be more specific, as shown in FIG. 7 which is a block diagram of the recording and reproducing system according to an embodiment of the present invention, the parameter information file of the present invention may be the contents list information file 16' of also storing the play list type information inputted by the contents list information file creating means 33' from the play list file creating means 34'. The play list files 17a, 17b are given unique play list file IDs provided to the contents list information file 16' by using the order of storing the aforementioned play list type information, and are managed by using the play list file IDs.

Controlling means 21' of the reproducing apparatus utilizes such management of the play list files 17a, 17b so as to promptly identify a reproducible play list file just by reading the contents list information file 16' without reading the play list files 17a, 17b.

(15) In addition, according to the above-mentioned embodiment, the data file of the present invention is the data file of the data file group 13 stored in the internal storage means 12.

However, the data file of the present invention is not limited thereto, but it may also be the data file of the data file group recorded on the CD-RW medium 15 for instance.

It is also possible, by using the recording apparatus of the present invention, to append the contents list information file of the present invention to the CD-RW medium having the data file recorded thereon by a recording apparatus in the past, and the CD-RW medium to which the contents list information file is thus appended can be reproduced, through the use of the contents list information file, by the reproducing apparatus of the present invention. Therefore, assets of the record medium created so far can also be effectively exploited.

Moreover, the program of the present invention is the program of having the functions of all or a part of the means (or apparatuses, elements and so on) of the above-mentioned recording and reproducing system, recording apparatus and reproducing apparatus of the present invention executed by a computer, which is the program operating in synergy with the computer.

In addition, the program of the present invention is the program of having the operations of all or a part of the steps (or processes, workings, actions and so on) of the above-mentioned recording and reproducing method, recording method and reproducing method of the present invention executed by the computer, which is the program operating in synergy with the computer.

In addition, the record medium of the present invention is the record medium supporting the program of having all or a part of the functions of all or a part of the means (or apparatuses, elements and so on) of the above-mentioned recording and reproducing system, recording apparatus and reproducing apparatus of the present invention executed by the computer, which is the record medium readable by the computer and having the above described functions performed by the above described program which is read in synergy with the above described computer.

In addition, the record medium of the present invention is the record medium supporting the program of having all or a part of the operations of all or a part of the steps (or processes, workings, actions and so on) of the above-mentioned recording and reproducing method, recording method and reproducing method of the present invention executed by the computer, which is the record medium readable by the computer and having the above described operations performed by the above described program which is read in synergy with the above described computer.

In addition, the record medium of the present invention is the record medium supporting a data structure utilized in synergy with the computer in all or a part of the means (or apparatuses, elements and so on) and the steps (or processes, workings, actions and so on) of the above-mentioned recording and reproducing system, recording apparatus, reproducing apparatus, recording and reproducing method, recording method and reproducing method of the present invention, which is the record medium readable by the computer and having the above described data structure which is read utilized in synergy with the above described computer.

Moreover, the above "part of the means (or apparatuses, elements and so on)" of the present invention means one or a few of such a plurality of means, and the above "part of the steps (or processes, workings, actions and so on)" of the present invention means one or a few of such a plurality of steps.

In addition, the above "functions of the means (or apparatuses, elements and so on)" of the present invention means all or a part the functions of the above described means, and the above "operations of the steps (or processes, workings, actions and so on)" of the present invention means all or a part of the operations of the above described steps.

In addition, a form of using the program of the present invention may be the form recorded on the record medium readable by the computer and operating in synergy with the computer.

In addition, a form of using the program of the present invention may be the form transmitted in a transmission medium and read by the computer to operate in synergy with the computer.

In addition, the data structure of the present invention includes a database, a data format, a data table, a data list, a data type and so on.

In addition, the record media include an ROM and so on, and the transmission media include the transmission media such as the Internet, light, a radio wave, a sound wave and so on.

In addition, the above described computer of the present invention is not limited to pure hardware such as a CPU, but may include firmware, an OS and peripherals on top of them.

Moreover, as described above, the configuration of the present invention may be implemented either software-wise or hardware-wise.

As is clear from the above description, the present invention has an advantage of being able to perform the play list reproduction even at the data processing level of the CD player and so on which cannot interpret the play list file in the HTML format.

What is claimed is:

1. A recording and reproducing system comprising:
   a record medium for holding a plurality of data files for storing predetermined data;
   play list recording means of recording a play list for describing reproduction order in which the predetermined data stored in all or a part of said plurality of data files respectively is reproduced by using a unique data file ID given to each of said data files in a play list file for storing said play list held in said record medium; and
   data reproducing means of reproducing the predetermined data stored in all or a part of said plurality of data files respectively by using said reproduction order based on said recorded play list
   wherein said plurality of data files further store parameter information used to reproduce said predetermined data respectively,
   parameter information recording means of recording all of the parameter information stored in said plurality of data files respectively in a parameter information file for storing said parameter information held in said record medium is further provided, and
   each of said plurality of data files is given said unique data file ID by using order in which said parameter information file stores said parameter information.

2. The recording and reproducing system according to claim 1,
   wherein said data files are managed by using said given unique data file IDs.

3. The recording and reproducing system according to claim 1,
   wherein said record medium holds a plurality of said play list files;
   each of said plurality of play list files has a play list file attribute; and
   said parameter information file further stores play list file attribute information on the play list file attribute which each of said plurality of play list files has.

4. The recording and reproducing system according to claim 3,
   wherein said plurality of play list files are given unique play list file IDs by using order in which said parameter information file stores said play list file attribute information; and
   said play list files are managed by using said given unique play list file IDs.

5. The recording and reproducing system according to claim 1,
   wherein said play list describes said reproduction order by using grouping.

6. The recording and reproducing system according to claim 1,
   wherein said play list describes said reproduction order to be rewritable.

7. A recording apparatus comprising: play list recording means of recording a play list in a play list file for storing the play list for describing reproduction order in which predetermined data stored in all or a part of a plurality of data files respectively is reproduced by using a unique data file ID given to each of said data files, said play list file held in a record medium for holding said plurality of data files for storing the predetermined data,
   wherein the predetermined data stored in all or a part of said plurality of data files respectively is reproduced by using said reproduction order based on said recorded play list,
   said plurality of data files further store parameter information used to reproduce said predetermined data respectively,
   parameter information recording means of recording all of the parameter information stored in said plurality of data files respectively in a parameter information file for storing said parameter information held in said record medium is further provided, and each of said plurality of data files is given said unique data file ID by using order in which said parameter information file stores said parameter information.

8. A reproducing apparatus, comprising: data reproducing means of reproducing predetermined data stored in all or a part of a plurality of data files respectively by using reproduction order based on a play list recorded in a play list file held in a record medium for holding a plurality of data files for storing predetermined data and a play list file for storing the play list for describing said reproduction order in which the predetermined data stored in all or a part of said plurality of data files respectively is reproduced by using a unique data file ID given to each of said data files wherein said plurality of data files further store parameter information used to reproduce said predetermined data respectively, all of the parameter information stored in said plurality of data files respectively in a parameter information file for storing said parameter information held in said record medium is recorded by parameter information recording means, and each of said plurality of data files is given said unique data file ID by using order in which said parameter information file stores said parameter information.

9. A record medium for holding a plurality of data files for storing predetermined data and a play list file for storing a play list for describing reproduction order in which the predetermined data stored in all or a part of said plurality of data files respectively is reproduced by using a unique data file ID given to each of said data files, wherein said play list is recorded in said play list file, and the predetermined data stored in all or a part of said plurality of data files respectively is reproduced by using said reproduction order based on said recorded play list, said plurality of data files further store parameter information used to reproduce said predetermined data respectively, all of the parameter information stored in said plurality of data files respectively in a parameter information file for storing said parameter information held in said record medium is recorded by parameter information recording means, and each of said plurality of data files is given said unique data file ID by using order in which said parameter information file stores said parameter information.

10. A recording and reproducing method comprising:

a play list recording step of recording a play list in a play list file held in a record medium for holding a plurality of data files for storing predetermined data and a play list file for storing the play list for describing reproduction order in which the predetermined data stored in all or a part of said plurality of data files respectively is reproduced by using a unique data file ID given to each of said data files; and data reproducing step of reproducing the predetermined data stored in all or a part of said plurality of data files respectively by using said reproduction order based on said recorded play list, wherein said plurality of data files further store parameter information used to reproduce said predetermined data respectively, all of the parameter information stored in said plurality of data files respectively in a parameter information file for storing said parameter information held in said record medium is recorded by parameter information recording means, and each of said plurality of data files is given said unique data file ID by using order in which said parameter information file stores said parameter information.

11. A recording method comprising a play list recording step of recording a play list in a play list file for storing the play list for describing reproduction order in which predetermined data stored in all or a part of a plurality of data files respectively is reproduced by using a unique data file ID given to each of said data files held in a record medium for holding said plurality of data files for storing the predetermined data, wherein the predetermined data stored in all or a part of said plurality of data files respectively is reproduced by using said reproduction order based on said recorded play list, said plurality of data files further store parameter information used to reproduce said predetermined data respectively, all of the parameter information stored in said plurality of data files respectively in a parameter information file for storing said parameter information held in said record medium is recorded by parameter information recording means, and each of said plurality of data files is given said unique data file ID by using order in which said parameter information file stores said parameter information.

12. A reproducing method comprising a data reproducing step of reproducing predetermined data stored in all or a part of a plurality of data files respectively by using reproduction order based on a play list recorded in a play list file held in a record medium for holding a plurality of data files for storing predetermined data and the play list file for storing the play list for describing said reproduction order in which the predetermined data stored in all or a part of said plurality of data files respectively is reproduced by using a unique data file ID given to each of said data files, wherein said plurality of data files further store parameter information used to reproduce said predetermined data respectively, all of the parameter information stored in said plurality of data files respectively in a parameter information file for storing said parameter information held in said record medium is recorded by parameter information recording means, and each of said plurality of data files is given said unique data file ID by using order in which said parameter information file stores said parameter information.

13. A medium, which is processable by a computer, supporting a program for causing a computer to execute a play list recording step and a data reproducing step of a recording and reproducing method according to claim 10.

14. A medium, which is processable by a computer, supporting a program for causing a computer to execute a play list recording step of a recording method according to claim 11.

15. A medium, which is processable by a computer, supporting a program for causing a computer to execute a data reproducing step of a reproducing method according to claim 12.

* * * * *